United States Patent
Tajika et al.

(10) Patent No.: US 10,902,231 B2
(45) Date of Patent: Jan. 26, 2021

(54) OPTICAL CODE READER

(71) Applicant: Keyence Corporation, Osaka (JP)

(72) Inventors: Taichi Tajika, Osaka (JP); Hideaki Miyoshi, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 16/659,649

(22) Filed: Oct. 22, 2019

(65) Prior Publication Data

US 2020/0160014 A1 May 21, 2020

(30) Foreign Application Priority Data

Nov. 21, 2018 (JP) .................. 2018-218025

(51) Int. Cl.
*G06K 7/10* (2006.01)
*G06K 7/14* (2006.01)

(52) U.S. Cl.
CPC ..... *G06K 7/10831* (2013.01); *G06K 7/10881* (2013.01); *G06K 7/1413* (2013.01); *G06K 7/1417* (2013.01)

(58) Field of Classification Search
CPC ......... G06K 7/108831; G06K 7/10881; G06K 7/1413; G06K 7/1417
See application file for complete search history.

(56) References Cited

U.S. PATENT DOCUMENTS 5,796,089 A * 8/1998 Marom .............. G06K 7/10722
235/462.24
2015/0347799 A1 * 12/2015 Gao .................. G06K 7/10801
235/454

FOREIGN PATENT DOCUMENTS

| JP | H07105302 A | 4/1995 |
| JP | H11312210 A | 11/1999 |
| JP | 2013206129 A | 10/2013 |

* cited by examiner

*Primary Examiner* — Laura A Gudorf
(74) *Attorney, Agent, or Firm* — Kilyk & Bowersox, P.L.L.C.

(57) ABSTRACT

The optical code reader includes a light-receiving region limiting optical member 122. The light-receiving region limiting optical member 122 is disposed between a transparent window 8 and an image sensor 102 and includes an imaging lens 100 for imaging reflected light received through the transparent window 8, on a light receiving surface 108 of the image sensor 102. The light-receiving region limiting optical member 122 forms an image Im(1) of an optical code Co in a first light receiving region 108(1) of the light receiving surface 108 and forms an image Im(2) of an optical code Co in a second light receiving region 108 (2) that is different from the first light receiving region 108(1). The image sensor 102 is disposed obliquely to a direction orthogonal to an optical axis Oax of the imaging lens 100.

8 Claims, 14 Drawing Sheets

FIG. 12
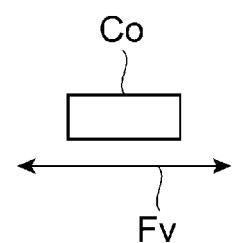
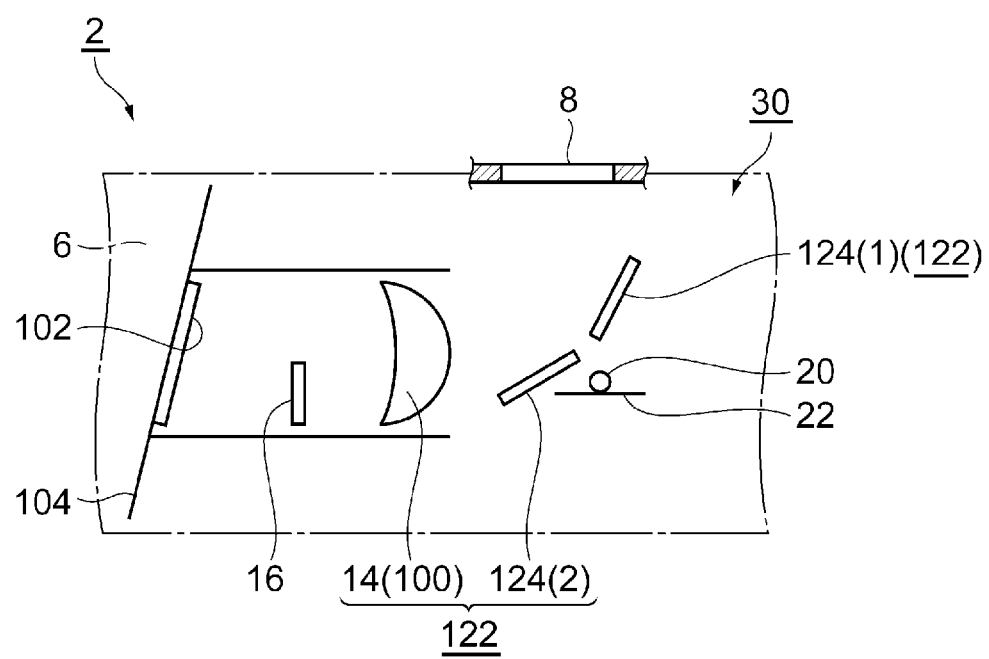

OPTICAL CODE READER

CROSS-REFERENCE TO RELATED APPLICATIONS

The present application claims foreign priority based on Japanese Patent Application No. 2018-218025, filed Nov. 21, 2018, the contents of which is incorporated herein by reference.

BACKGROUND OF THE INVENTION

1. Field of the Invention

The present invention relates to an optical code reader.

2. Description of Related Art

Optical codes are used for various purposes such as for managing products, and sorting and managing packages in distribution. A bar code is a typical example of an optical code and is called "one-dimensional code". As its name indicates, the bar code is composed of laterally arranged multiple information elements having a horizontally long outer shape as a whole. Other typical example of the optical code is a "two-dimensional code". As its name indicates, this optical code is composed of matrix-arranged information elements having a square or hexagonal outer shape as a whole.

JP-A-7-105302 discloses an optical code reader. This optical code reader is a bar code reader for a bar code and is hand-held type. The basic configuration of this handy bar code reader includes a light source, an imaging lens, and an image sensor. The light source emits light to a bar code. The imaging lens images light that is reflected back from the bar code. The image sensor receives the image that is generated by the imaging lens. Under a bright environment, the bar code reader is normally used with a light source turned off, on the basis of settings selectively set by an operator.

The bar code reader that is disclosed in JP-A-7-105302 has an optical path changing mirror between an imaging lens and a transparent window for receiving light that is reflected back from a bar code. The optical path changing mirror changes the optical path of the reflected light such that the reflected light enters the imaging lens.

JP-A-7-105302 describes generation of distortion in an image that is obtained by bringing the bar code reader close to an inclined bar code. To improve this undesirable distortion, this existing invention involves disposing the image sensor obliquely to a vertical plane orthogonal to an optical axis of the imaging lens. The oblique angle of the image sensor is set to have the same angle as an oblique angle of a label with the bar code.

A noncontact handheld optical code reader is used in various environments. For example, an optical code of each of stacked packing boxes stored in a warehouse may be read. In this case, an operator needs to make the optical code enter a field of view and a range of a depth of field of the optical code reader. That is, the operator needs to direct the optical code reader in the hand to a target packing box and to position the optical code reader so that the distance from the optical code will come within a specific range. This working process imposes a large burden on the operator who handles a large number of packages, in advancing the work smoothly. To reduce this burden on the operator, an optical code reader having an automatic focusing mechanism has been developed as disclosed in JP-A-2013-206129.

The optical code reader disclosed in JP-A-2013-206129 employs a variable focus liquid lens as an imaging lens. This optical code reader has a driving circuit that changes voltage to be applied to the liquid lens in order to variably adjust the focusing position by the liquid lens.

The liquid lens requires a short time to perform focusing and needs no mechanical driving mechanism, but the liquid lens is expensive at this moment. For this reason, the liquid lens is limitedly used in a microscope and an optical apparatus for research.

An optical code reader having an automatic focusing mechanism has a depth of field that is able to be enlarged by operating the automatic focusing mechanism. However, when the automatic focusing mechanism is operated at any time, the automatic focusing mechanism operates each time the optical code reader is directed to a target optical code, and an operator needs to maintain the attitude of the optical code reader until the focusing is completed. To solve this problem, the following technique is devised in the invention disclosed in JP-A-2013-206129. That is, some focusing positions are registered in a memory in advance. When an operator operates to read an optical code, a desired focusing position is selected from among the registered focusing positions as a preparation process.

The optical code reader disclosed in JP-A-2013-206129 focuses so as to have the focusing position that is selected by the operator upon the actual operation by the operator. In the stage of performing a read processing by the optical code reader, the optical code reader is in a state in which the focusing position is fixed.

JP-A-11-312210 discloses an optical code reader having a focusing position variable lens unit that mechanically changes the focusing position. This optical code reader has two sensor units, and each of the sensor units includes a focusing position variable lens unit and an image sensor.

An operator sets one of the sensor units as a unit for reading a one-dimensional code, such as a bar code, and sets the other sensor unit as a unit for reading a two-dimensional code. Thus, the sensor units are selectively used depending on the type of a target optical code.

SUMMARY OF THE INVENTION

Recent development of electronic commerce (E-commerce) and internet of things (IoT) drastically increases distribution volume, causing a labor shortage. In such situation, reduction of labor on an operator in operation of an optical code reader is a subject that should be dealt with urgently.

In one example, as for a lot of packing boxes that are stacked on a floor or a shelf in a warehouse, an operator is required to move such as stretch the arm, to make the distance from each of the packing boxes come within a specific range. Specifically, in a case of using an optical code reader with a fixed focusing position, it is necessary to move the optical code reader in the hand so that an optical code of a target packing box will enter a range of the depth of field. Movements of the whole body of the operator are necessary to thus move the optical code reader. The operator is required to take various postures by stretching the hand, folding the body, taking a half-sitting posture, stretching the body, or other movements. This imparts a large burden on the operator that conducts a great amount of reading work.

An object of the present invention is to provide an optical code reader that enables reduction of labor of an operator and improvement of work efficiency.

FIGS. 1A and 1B are schematic structural diagrams for explaining a principle of an optical system of an optical code reader. The reference symbol 100 denotes an imaging lens. The reference symbol Co denotes a target optical code.

FIG. 1A shows an imaging position in a case of focusing on an optical code Co at a relatively distant position. FIG. 1B shows an imaging position in a case of focusing on an optical code Co at a close position. In the drawings, the reference symbol "Pi" denotes an imaging position, and the reference symbol "Pf" denotes a focusing position. In particular, a reference symbol "(d)" is added to denote a distant focusing position, and a reference symbol "(c)" is added to denote a close focusing position, for explaining a relatively distant focusing position or a relatively close focusing position.

As immediately known from the comparison between FIGS. 1A and 1B, a distant imaging position Pi(d) shown in FIG. 1A is closer to an imaging lens 100 than a close imaging position Pi(c) shown in FIG. 1B. This is also known from the following publicly known formula of lens.

Formula of lens: $1/a + 1/b = 1/f$

The symbol "a" denotes an imaging distance between the imaging position Pi and the imaging lens 100. The symbol "b" denotes a focusing distance between the focusing position Pf and the imaging lens 100. The symbol "f" denotes a focal distance of the imaging lens 100.

A relationship between an imaging distance "a" and a focusing distance "b" is shown in FIG. 2. As known from FIG. 2, the value of the imaging distance "a" decreases with increase in the value of the focusing distance "b". Conversely, the value of the imaging distance "a" increases with decrease in the value of the focusing distance "b". As immediately known from the comparison between FIGS. 1A and 1B, the distant imaging position Pi(d) shown in FIG. 1A is closer to the imaging lens 100 than the close imaging position Pi(c) shown in FIG. 1B as described above.

FIGS. 3A and 3B are schematic structural diagrams of an optical system included in a conventional optical code reader. An optical system 9 shown in the drawing includes a focusing position variable lens module. Referring to FIGS. 3A and 3B, the reference symbol 102 denotes an image sensor, and the image sensor 102 is typically mounted on a board 104. The optical system 9 having the focusing position variable lens module focuses by changing the position of the imaging lens 100 depending on the distance from a target optical code Co. This focusing substantially follows the formula of lens. FIG. 3A shows a position of the imaging lens 100 in a case of focusing on an optical code Co at a distant position. FIG. 3B shows a position of the imaging lens 100 in a case of focusing on an optical code Co at a close position.

As known from FIGS. 3A and 3B, the imaging lens 100 is positioned close to the image sensor 102 in focusing on a distant position (FIG. 3A), and the imaging lens 100 is positioned far from the image sensor 102 in focusing on a close position (FIG. 3B). This is a principle of the focusing position variable mechanism.

The above describes the principle of the mechanical focusing position variable mechanism. A principle of the focusing position variable mechanism using the liquid lens described with reference to JP-A-2013-206129 is substantially the same as the above-described principle in the point that the relative relationship between the imaging distance "a" and the focusing distance "b" is adjusted. The mechanical focusing position variable mechanism differs from the liquid lens in that the mechanical focusing position variable mechanism adjusts the relative relationship between the imaging distance "a" and the focusing distance "b" by mechanically changing the position of the imaging lens 100. On the other hand, the liquid lens adjusts the relative relationship between the imaging distance "a" and the focusing distance "b" by variably controlling the focal distance of the imaging lens 100.

In the case of employing the mechanical focusing position variable mechanism, a driving mechanism for changing the position of the imaging lens 100 is necessary, which can cause increase in dimensions of the optical code reader and can also cause malfunction due to the mechanical structure. In the case of employing the mechanical focusing position variable mechanism or the focusing position variable mechanism using the liquid lens, operation or processing for appropriately setting the focusing position should be performed prior to start of the read processing.

The inventors of the present invention reviewed the conventional concept itself, in developing an optical code reader that enables reduction of labor of an operator and improvement of work efficiency. The thought processes of the inventors are described below.

A conventional optical code reader employs the same principle as an optical system of a digital camera or an electron microscope. The digital camera and the electron microscope are required to perform accurate focusing. A primary constitutional element for focusing is an imaging lens. From this point of view, the focusing position variable mechanism for each of a digital camera and an electron microscope has been developed in primary consideration of the imaging lens. This concept is extended and applied to development of a focusing position variable mechanism of an optical code reader.

The inventors of the present invention have paid attention to a large difference in required accuracy between the focusing of an optical code reader and the focusing of a digital camera or an electron microscope. It is necessary for an optical code reader to perform focusing at an accuracy that enables decoding an image of an optical code. A primary function that is required for an optical code reader is reading information from an image of an optical code, and therefore, the optical code reader does not need to obtain a precise image of a target object, which is required for a digital camera.

The inventors of the present invention have found that it is not necessary to use an imaging lens from the point of view described above. In consideration of this finding, the present invention has been developed on the basis of the relationship between the imaging distance "a" and the focusing distance "b" described with reference to FIG. 2, instead of a conventional design guideline based primarily on an imaging lens.

FIG. 4 is a diagram for explaining a concept of an optical system included in an optical code reader of the present invention. FIG. 5 is a diagram for explaining a typical conventional optical system employed in an optical code reader for comparison. The reference symbol 106 denotes a lens barrel.

FIG. 6 is a schematic diagram of the available image sensor 102. The image sensor 102, which is, for example, a CMOS sensor, typically has a rectangular outer shape in a plan view. In the drawing, the reference symbol Ax(L) denotes a long axis of the image sensor 102, and the reference symbol Ax(S) denotes a short axis of the image sensor 102. The image sensor 102 has a light receiving surface 108 that is constituted of multiple imaging elements 110 in a matrix arrangement.

Returning to FIG. 5, an optical system 200 included in a conventional optical code reader is placed on a vertical plane 112 on which the image sensor 102 orthogonally crosses an optical axis Oax of the imaging lens 100. On the condition that an optical code Co to be imaged enters a field of view Fv, the image of the optical code Co is captured by the image sensor 102. In the condition in which the optical code Co is positioned within a depth of field Df, a focused image is formed on the image sensor 102.

Returning to FIG. 4, an optical system 120 included in the optical code reader of the present invention has the image sensor 102 that is disposed obliquely to the vertical plane 112 as a typical example. FIG. 4 is a diagram for explaining a basic concept regarding the optical system 120 in the present invention, and thus, only essential elements are extracted and illustrated. Of course, for example, the optical path changing mirror, which is described with reference to JP-A-7-105302, can be added.

In FIG. 4, the reference symbol θ denotes an oblique angle of the image sensor 102. Obliquely disposing the image sensor 102 makes imaging distances "a" at one end 102a and the other end 102b differ from each other in the oblique direction of the image sensor 102. The imaging distance "a" at the one end 102a of the image sensor 102 is shown in the drawing by adding a symbol "(S)". The imaging distance "a" at the other end 102b is shown in the drawing by adding a symbol "(L)". Making the image sensor 102 be obliquely brings the one end 102a in the oblique direction close to the imaging lens 100 and brings the other end 102b in the oblique direction away from the imaging lens 100. Thus, the value of the imaging distance a(S) on the one end 102a side is relatively decreased, and the value of the imaging distance a(L) on the other end 102b side is relatively increased.

In accordance with the relationship between the imaging distance "a" and the focusing distance "b", which is described with reference to FIG. 2, the value of the focusing distance "b" increases as the value of the imaging distance "a" decreases. Conversely, the value of the focusing distance "b" decreases as the value of the imaging distance "a" increases. Thus, in the optical system 120 in the present invention, the focusing distance "b" of the imaging lens 100 varies as shown by an oblique line L(b) in FIG. 4, due to the image sensor 102 that is disposed obliquely. That is, the oblique disposition of the image sensor 102 makes the value of the focusing distance "b" of the imaging lens 100 substantially gradually change in the oblique direction of the image sensor 102, that is, in the width direction of the field of view Fv and also makes the value of the depth of field Df substantially gradually change in the width direction of the field of view Fv.

As shown in FIG. 4, in the condition in which the image sensor 102 is disposed obliquely, among two regions "A" and "B" in the field of view Fv, the focusing position is relatively distant in the region "A", and the focusing position is relatively close in the region "B".

The focusing distance "b" and the depth of field Df have a correlation. In a case in which the value of the focusing distance "b" is small, the depth of field Df is small. Conversely, in a case in which the value of the focusing distance "b" is large, the depth of field Df is large. Thus, the oblique disposition of the image sensor 102 makes the value of the depth of field Df substantially gradually change in the width direction of the field of view Fv. On the basis of this, the optical code reader of the present invention substantially has a characteristic as if to be equipped with multiple imaging means, that is, multiple cameras, due to the oblique disposition of the image sensor 102.

An outline of the basic concept of the present invention is illustrated by using the image sensor 102 that is disposed obliquely, as a typical example of changing the focusing distance "b". However, instead of the oblique disposition of the image sensor 102, a focusing distance adjusting medium 44 may be interposed between the imaging lens 100 and the image sensor 102. The focusing distance adjusting medium 44 is shown in FIG. 13 and will be described in detail later. The focusing distance adjusting medium 44 is made of a medium having a refractive index that gradually changes in a direction orthogonal to the optical axis. The focusing distance adjusting medium 44 will be described in detail in explanation of an embodiment with reference to FIG. 13.

FIGS. 7A and 7B are diagrams for explaining other characteristic of the optical system 120 included in the optical code reader of the present invention. As shown in FIGS. 7A and 7B, the optical system 120 includes a light-receiving region limiting optical member 122 that receives light in the field of view Fv and that makes the received light enter a limited region of the image sensor 102. The light-receiving region limiting optical member 122 typically includes the imaging lens 100 and a mirror or a prism that is disposed on an incident light side of the imaging lens 100. The mirror or the prism receives light in the field of view Fv in cooperation with the imaging lens 100 and makes the received light enter the limited region of the image sensor 102.

In the optical system 120 included in the optical code reader of the present invention, the light-receiving region limiting optical member 122 forms the same image of the optical code in each region that is defined by dividing the light receiving surface 108 of the image sensor 102. It is not necessary to strictly specify the boundary between the multiple regions. The boundary parts of two adjacent regions may overlap each other. The optical system 120 shown in FIGS. 7A and 7B has two divided regions in the light receiving surface 108 of the image sensor 102, but this is merely an example. As shown in FIGS. 7A and 7B, the light-receiving region limiting optical member 122 is composed of the imaging lens 100 and two mirrors 124(1) and 124(2). However, one prism 52 shown in FIGS. 14 and 15 may be used instead of the two mirrors 124(1) and 124(2).

In the case of using multiple mirrors 124 to compose a part of the light-receiving region limiting optical member 122 or in the case of dividing the light receiving surface 108 of the image sensor 102 into two regions, for example, the two mirrors 124(1) and 124(2) are included in the light-receiving region limiting optical member 122. To avoid complicated diagram, the optical system 120 is shown in FIGS. 7A and 7B in a separated manner. FIG. 7A is a conceptual diagram relating to a first mirror 124(1) of the light-receiving region limiting optical member 122. FIG. 7B is a conceptual diagram relating to a second mirror 124(2) of the light-receiving region limiting optical member 122.

As shown in FIG. 7A, the first mirror 124(1) functions for forming an image in a first region 108 (1) of the light receiving surface 108 of the image sensor 102 in cooperation with the imaging lens 100. Thus, an optical code that is positioned in the field of view Fv is imaged in the first region 108 (1) of the light receiving surface 108 of the image sensor 102 by the first mirror 124(1). In the example shown in FIG. 7A in which the image sensor 102 is made obliquely in the counterclockwise direction, an image is formed in the first region 108 (1) by focusing at a close position.

On the other hand, as shown in FIG. 7B, the second mirror 124(2) functions for forming an image in a second region 108(2) of the light receiving surface 108 of the image sensor 102 in cooperation with the imaging lens 100. The imaging lens 100 relating to the second mirror 124(2) is also used as the imaging lens 100 relating to the first mirror 124(1) described with reference to FIG. 7A. The shared imaging lens 100 and the second mirror 124(2) cooperate with each other to form an image of the optical code, which is positioned in the field of view Fv, in the second region 108(2) of the light receiving surface 108 of the image sensor 102. In the example shown in FIG. 7B in which the image sensor 102 is made obliquely in the counterclockwise direction, an image is formed in the second region 108(2) by focusing at a distant position. It is not necessary to clearly define the first region 108(1) and the second region 108(2) of the light receiving surface 108 of the image sensor 102, and the boundary parts of the first region 108(1) and the second region 108(2) may overlap each other.

As described above, the image in the first region 108(1) and the image in the second region 108(2) are formed by the shared imaging lens 100. That is, the light in the common field of view Fv is allocated to the first region 108(1) and the second region 108(2) respectively by the first mirror 124(1) and the second mirror 124(2) via the shared imaging lens 100, whereby an image is formed in each of the first region 108(1) and the second region 108(2) of the image sensor 102.

In a modification example in which the image sensor 102 is made obliquely in the clockwise direction, an image is formed in the first region 108(1) by focusing at a distant position, and an image is formed in the second region 108(2) by focusing at a close position.

In the optical system 120 included in the optical code reader according to one aspect of the present invention, the oblique disposition of the image sensor 102 and the use of the light-receiving region limiting optical member 122 make an image of, for example, an optical code positioned in the field of view Fv, be formed in each of the first region 108(1) and the second region 108(2) of the image sensor 102. That is, the light-receiving region limiting optical member 122 includes the shared imaging lens 100, and light in the common field of view Fv is allocated to each of the first region 108(1) and the second region 108(2) of the image sensor 102 via the shared imaging lens 100. As a result, a first image Im(1) and a second image Im(2) of the same optical code Co are respectively formed in the first region 108(1) and the second region 108(2) of the image sensor 102. The oblique disposition of the image sensor 102 makes focuses of the first image Im(1) and the second image Im(2) differ from each other.

FIG. 8 shows the images Im of the optical code imaged by the image sensor 102 of the optical system 120 shown in FIGS. 7A and 7B. The first region 108(1) and the second region 108(2) of the light receiving surface 108 of the image sensor 102 are separated by a long axis Ax(L). However, it should be understood that this is merely an example. As shown in FIG. 8, in the condition in which the image sensor 102 is obliquely disposed in a short axis Ax(S) direction, the first image Im(1) is captured in the first region 108(1), and the second image Im(2) is captured in the second region 108(2), in the light receiving surface 108 across the long axis Ax(L) of the image sensor 102. In the case in which the target optical code Co is a bar code, the outer shapes of the first image Im(1) and the second image Im(2) have a rectangular shape in a plan view. From this point of view, it is preferable to design so that a long axis Ax(im) of each of the first image Im(1) and the second image Im(2) will extend in the direction of the long axis Ax(L) of the image sensor 102. This design allows the first image Im(1) and the second image Im(2) to be positioned so as to face each other across the long axis Ax(L) of the image sensor 102 while the long axis Ax(im) of each of the first image Im(1) and the second image Im(2) extends in the direction of the long axis Ax(L) of the image sensor 102, as shown in FIG. 8.

The first image Im(1) in the first region 108(1) and the second image Im(2) in the second region 108(2) are the images of the same optical code Co. As described above, the first mirror 124(1) and the second mirror 124(2) that cooperate with the shared imaging lens 100 cause formation of the first image Im(1) and the second image Im(2) of the same optical code Co in the first region 108(1) and the second region 108(2).

As for the light receiving surface 108 of the image sensor 102 that is obliquely disposed in the short axis Ax(S) direction, the focusing distance "b" gradually changes in the direction of the short axis Ax(S). Thus, the focus of the first image Im(1) in the first region 108(1) and the focus of the second image Im(2) in the second region 108(2) differ from each other. In one example, while the first image Im(1) may be in focus, the second image Im(2) may be out of focus in some cases. In another example, the first image Im(1) may be slightly out of focus in the direction of the short axis Ax(S). Still, it is enough that the optical code reader correctly reads the target optical code Co from either one of the first image Im(1) and the second image Im(2) captured at the light receiving surface 108. For example, in a case of starting decoding from the first region 108(1), the read processing can be finished at the time the optical code is decoded during reading the first image Im(1), and the read processing for the rest of the first image Im(1) and the second image Im(2) is not necessary. In a case in which decoding is failed by reading the first image Im(1), the read processing for the second image Im(2) is then performed.

The optical code reader of the present invention has a function substantially the same as the function obtained by using two cameras or two image sensors having different focusing positions to image the same optical code. The optical code reader of the present invention has an increased depth of field. Decoding an image captured by the image sensor 102 is executed in the same manner as in a conventional technique, and therefore, the reading speed is the same as that of a conventional technique. A mechanical mechanism is not provided, thereby preventing generation of malfunction that tends to occur in a conventional automatic focusing mechanism.

Effects and other purposes of the present invention will become apparent from descriptions of embodiments of the present invention with reference to the accompanying drawings.

BRIEF DESCRIPTION OF THE DRAWINGS

FIG. 1A shows an imaging position in a case of focusing on an optical code at a relatively distant position;

FIG. 1B shows an imaging position in a case of focusing on an optical code at a close position;

FIG. 12 shows a configuration of an optical system included in the optical code reader of the first embodiment;

DESCRIPTION OF EMBODIMENTS

Embodiments

Figure 9:
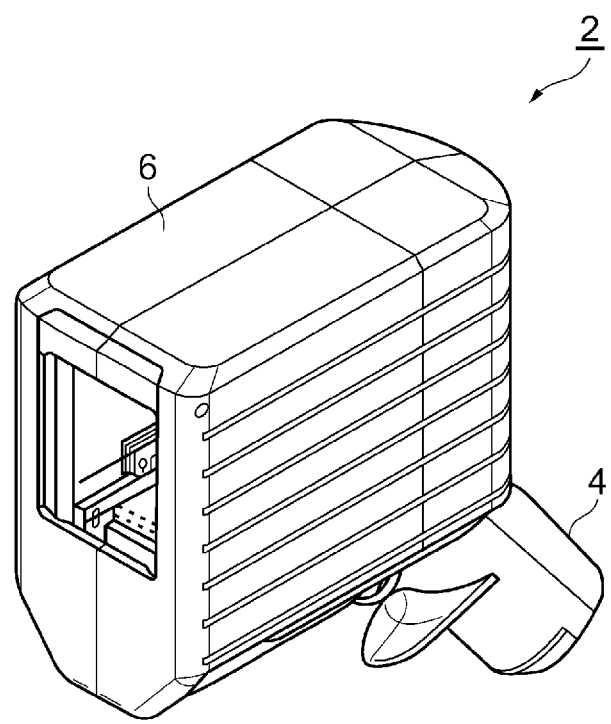
FIG. 9 is a perspective view of an optical code reader of a first embodiment.
Figure 10:
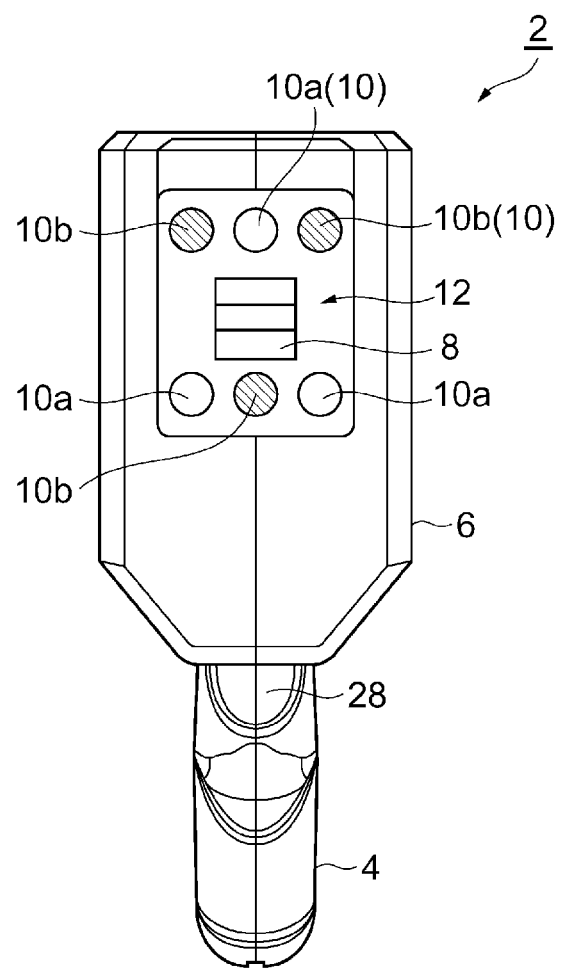
FIG. 10 is a front view of the optical code reader of the first embodiment.
Figure 11:
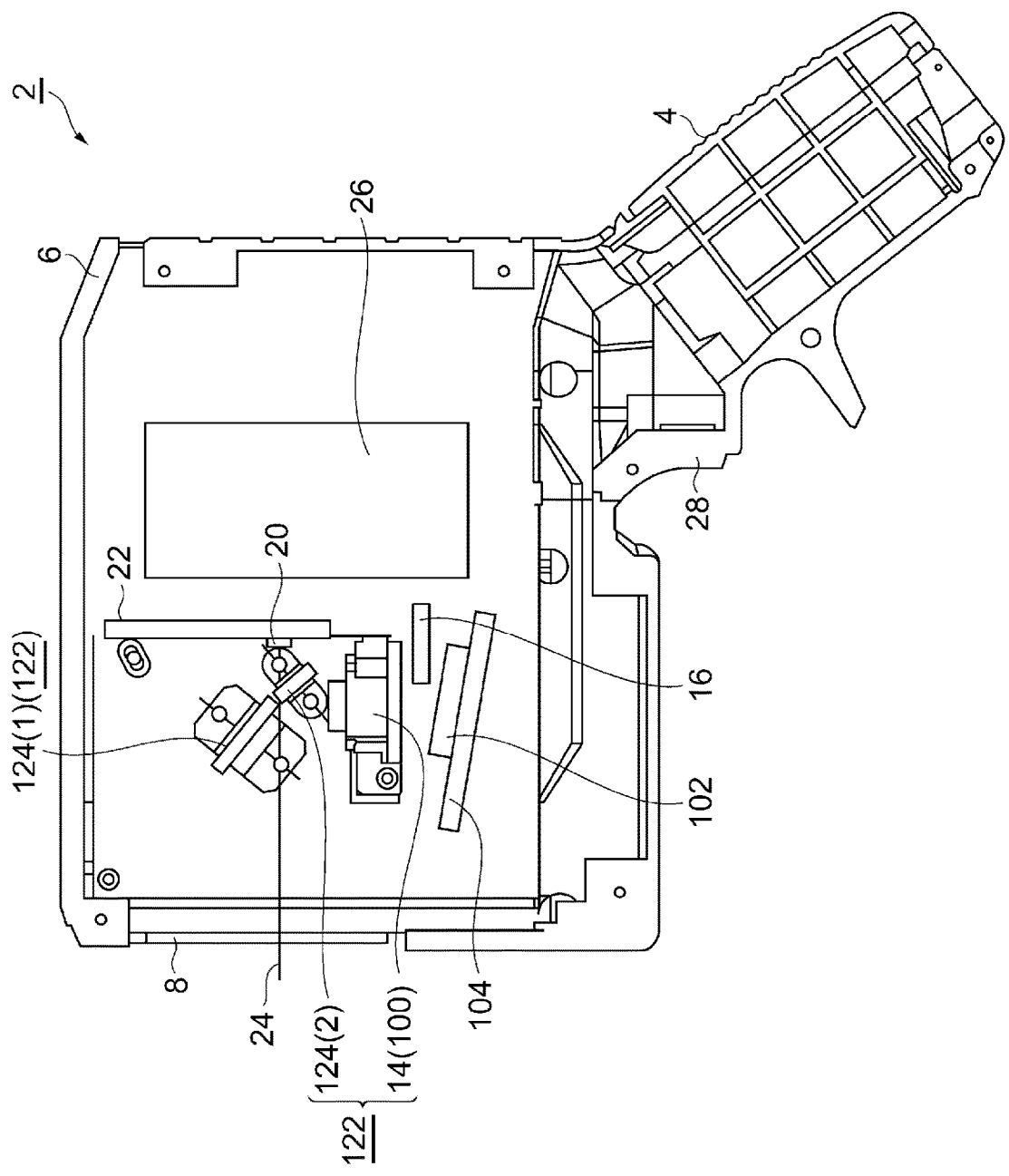
FIG. 11 shows an internal configuration of the optical code reader of the first embodiment.

Embodiments of the present invention are explained below with reference to the accompanying drawings. FIGS. 9 to 11 show an optical code reader of a first embodiment. FIG. 9 is a perspective view, FIG. 10 is a front view, and FIG. 11 shows an internal configuration. An optical code reader 2 of the first embodiment includes a grip 4. An operator operates the optical code reader 2 by gripping the grip 4. That is, the optical code reader 2 is hand-held type.

As shown in FIG. 10, the optical code reader 2 of the first embodiment has a rectangular transparent window 8 that is provided to a device body 6 and receives light that is reflected back from a target object (optical code) through the transparent window 8. Multiple light sources or lightings 10 that project light to the target object are disposed around the transparent window 8. The light sources 10 include a direct lighting 10a and a polarization lighting 10b, and the direct lighting 10a and the polarization lighting 10b are selected depending on situations. A glass dust cover or an acrylic dust cover is attached to the transparent window 8 in order to prevent dust and small particles from entering the case, but the dust cover is detachable. That is, the transparent window 8 is an example of an "open window" recited in the claims, and the use of the dust cover is optional.

FIGS. 9 and 11 show the optical code reader 2 with the dust cover and a unit 12 having the light sources 10 detached. As shown in FIG. 11, the device body 6 of the optical code reader 2 houses a first mirror 124(1), a second mirror 124(2), an imaging lens module 14, a polarization filter 16, an image sensor 102 composed of a CMOS, and a CMOS board 104 that are disposed in this order from the transparent window 8 side. The first mirror 124(1), the second mirror 124(2), and the imaging lens module constitutes the light-receiving region limiting optical member 122. The imaging lens module 14 is a specific example of the imaging lens 100. The polarization filter 16 may be detachable or may be undetachable.

An aimer light source 20 is disposed rearward of and adjacent to the first mirror 124(1) and the second mirror 124(2), which partially constitute the light-receiving region limiting optical member 122. The aimer light source 20 is mounted on a board 22 for the aimer. The aimer light source 20 is positioned so that aimer light passes through a gap between the first mirror 124(1) and the second mirror 124(2). The reference symbol 26 in FIG. 11 denotes a control board.

Figure 7A:
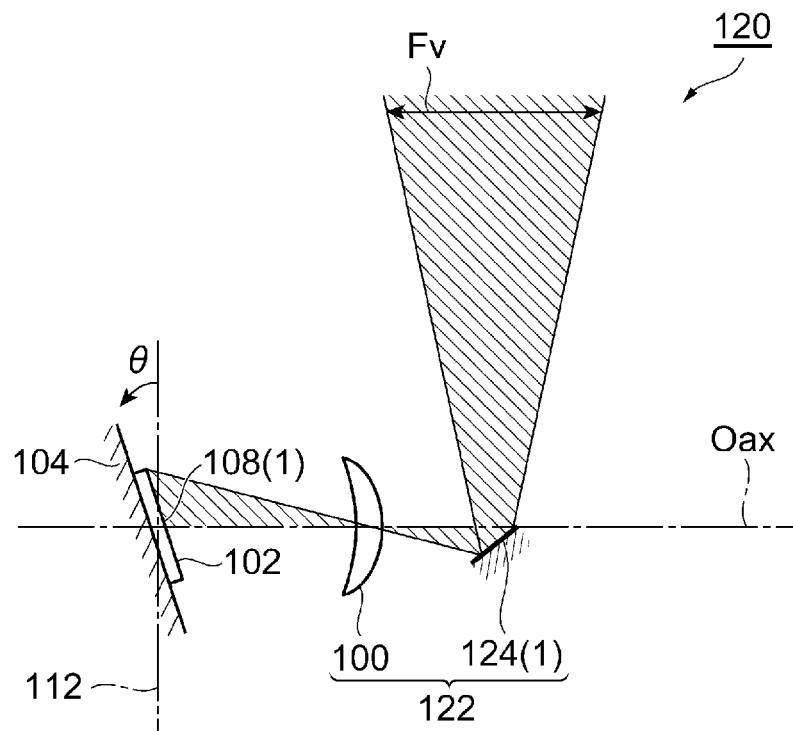
FIGS. 7A and 7B are diagrams for explaining other characteristic of the optical system included in the optical code reader of the present invention.
Figure 7B:
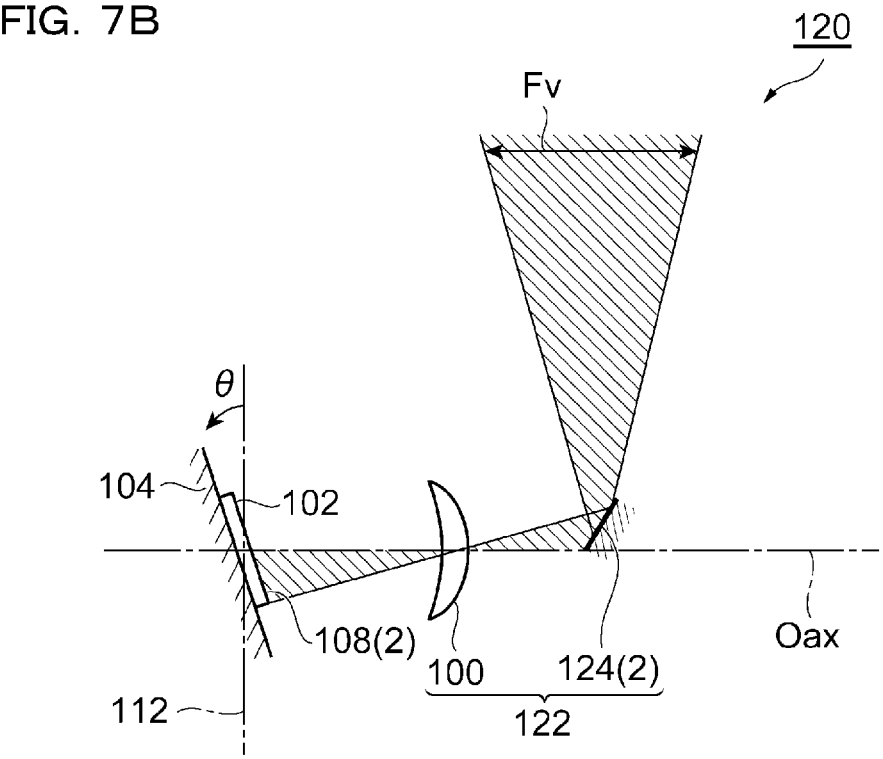
Figure 8:
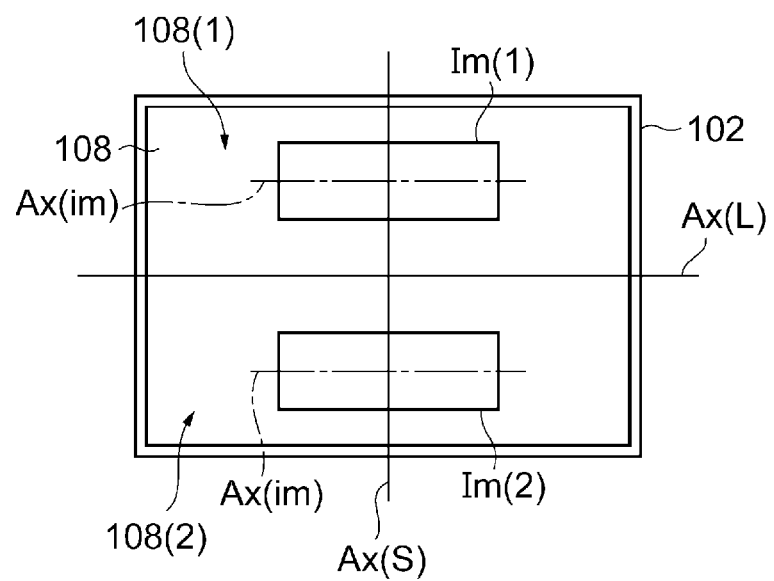
FIG. 8 shows images of an optical code imaged by an image sensor of the optical system shown in FIGS. 7A and 7B.

FIG. 12 shows the configuration relating to an optical system 30 included in the optical code reader 2 of the first embodiment. The optical system 30 shown in FIG. 12 is substantially the same as the optical system 120 described with reference to FIGS. 7A and 7B. However, the disposition of the polarization filter 16 is characteristic of the optical system 30 of the embodiment shown in FIG. 12. A second region 108(2) of the image sensor 102, which is specified by the second mirror 124(2), is obliquely disposed in the clockwise direction in FIG. 12, thereby having a close focusing position Pf compared with that for a first region 108(1). The polarization filter 16 is disposed in a light receiving region on a close field of view side in a limited region on the close field of view side specified in relation to the oblique direction of the image sensor 102.

As shown in FIGS. 11 and 12, the grip 4 is provided with an imaging trigger 28, and an operator captures an image of a target optical code Co, in each of the first region 108(1) and the second region 108(2) of the image sensor 102, by operating the imaging trigger 28 with the fingers gripping the grip 4. A first image Im(1) and a second Im(2) that are respectively formed in the first region 108(1) and the second region 108(2) are images of the same optical code Co.

Disposing the polarization filter 16 in a limited region has the following advantages. That is, using a polarization filter normally decreases the quantity of light that enters an image sensor. For this reason, a polarization lighting is normally used in a case in which a focusing distance Pf is close, that is, a distance between a target optical code and a reader is short. As for the polarization filter, in more detail, an optical code reader with a polarization filter and an optical code reader without a polarization filter are prepared in a typical conventional method. These optical code readers are selectively used such that the optical code reader with the polarization filter is used in reading an optical code at a close position, whereas the optical code reader without the polarization filter is used in reading an optical code at a distant position.

In the optical system 30 of the first embodiment in which the image sensor 102 is obliquely disposed in the clockwise direction, light that passes through the polarization filter 16 enters the second region 108(2), which is used in focusing on an optical code Co at a relatively close position. On the other hand, light enters the first region 108(1), which is used in focusing on an optical code Co at a relatively distant position, without passing through a polarization filter. Thus, the quantity of light that enters the first region 108(1) for middle and long-distance fields of views is not decreased although the polarization filter exists. This causes no influence on the reading performance relative to middle and long distances.

Meanwhile, in the optical system 30 of the first embodiment, the reading performance at the second region 108(2) of the image sensor 102, that is, the light receiving region on a close field of view side, is improved by the polarization filter 16. That is, disposing the polarization filter 16 causes, for example, removal of halation, and provides an image that facilitates decoding. On the other hand, the reading performance at the first region 108(1), that is, the light receiving region for middle and long-distance fields of views, is maintained because a polarization filter is not used, thereby causing no reduction in the quantity of light. The polarization filter 16 may be disposed on a code side relative to the imaging lens 100. A member that changes optical characteristics of a field of view, such as a color filter, may be disposed instead of a polarization filter or a polarization plate. Disposing such a member enables obtaining images with different characteristics at the same time, relative to the same field of view. This results in achieving more robust code reading from the point of view of factors such as depth of field, color, and polarization of light.

The advantages of disposing the aimer light source 20 will be described with reference to FIGS. 11 and 12. It should be understood that the aimer light source 20 includes an aimer lens that is conventionally known. As described above, the aimer light source 20 is disposed rearward of the first mirror 124(1) and the second mirror 124(2), and aimer light 24 shown in FIG. 11 is directed to a target object (optical code Co) through the gap between the first mirror 124(1) and the second mirror 124(2).

Figure 1A:
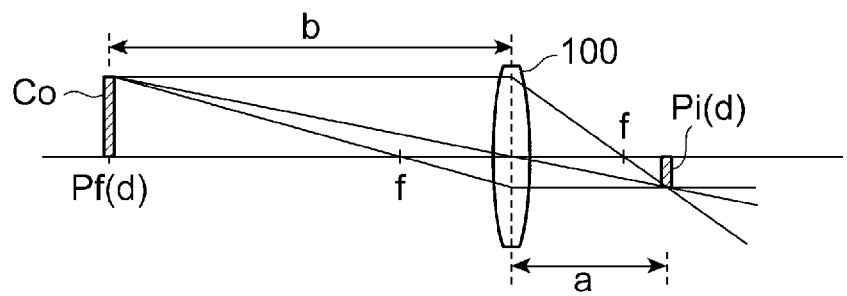
FIGS. 1A and 1B are schematic structural diagrams for explaining a principle of an optical system of an optical code reader.
Figure 1B:
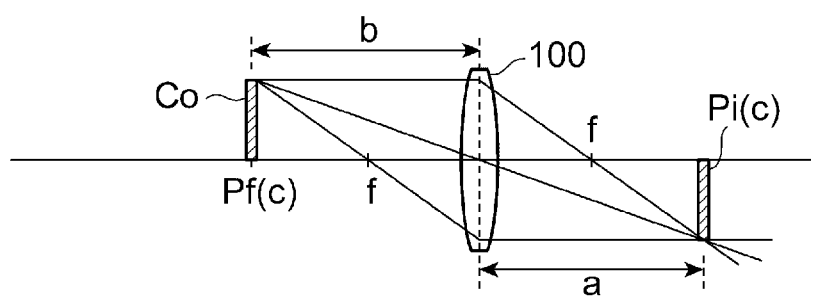
Figure 2:
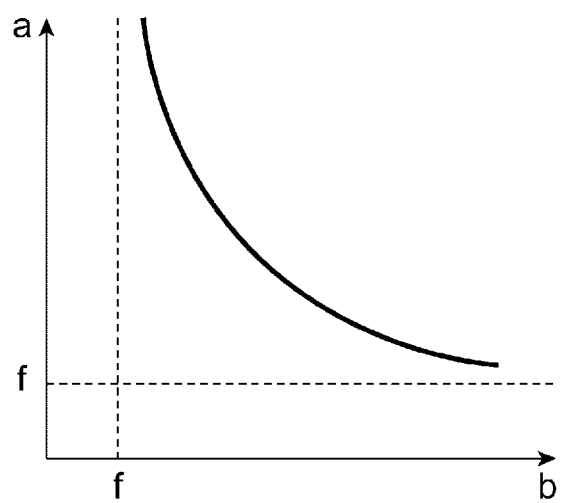
FIG. 2 shows a relationship between an imaging distance and a focusing distance.
Figure 3:
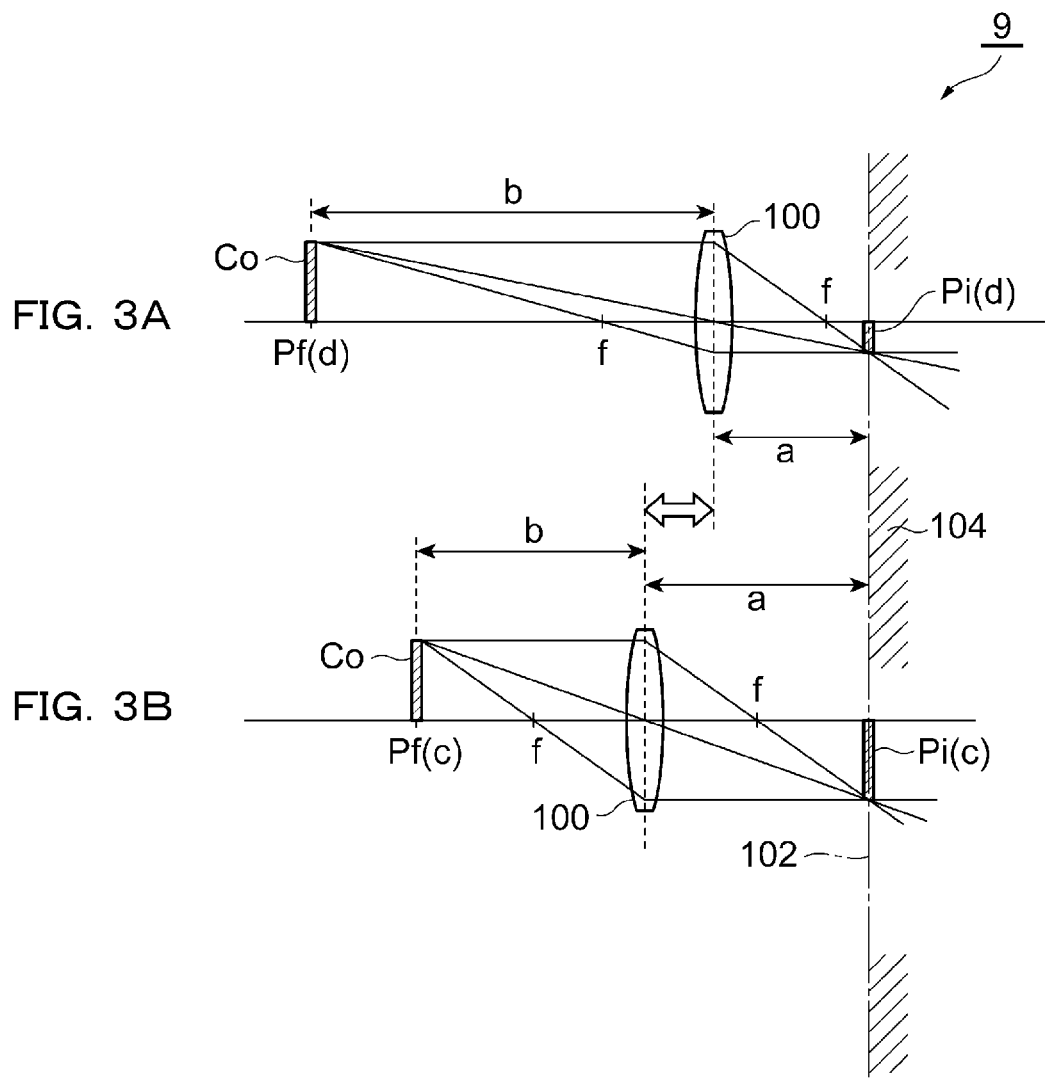
FIGS. 3A and 3B are schematic structural diagrams of an optical system included in a conventional optical code reader.
Figure 4:
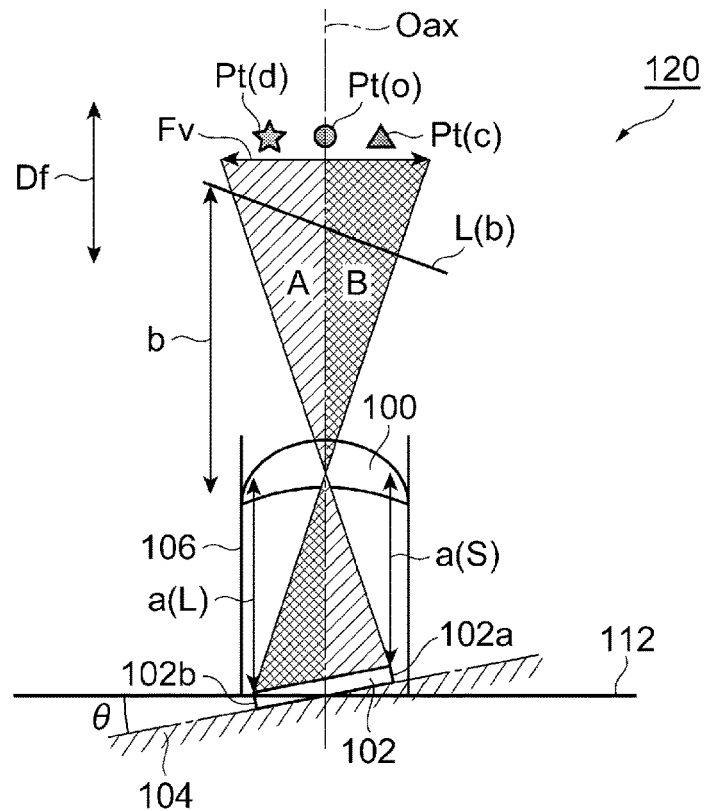
FIG. 4 is a diagram for explaining a concept of an optical system included in an optical code reader of the present invention.
Figure 5:
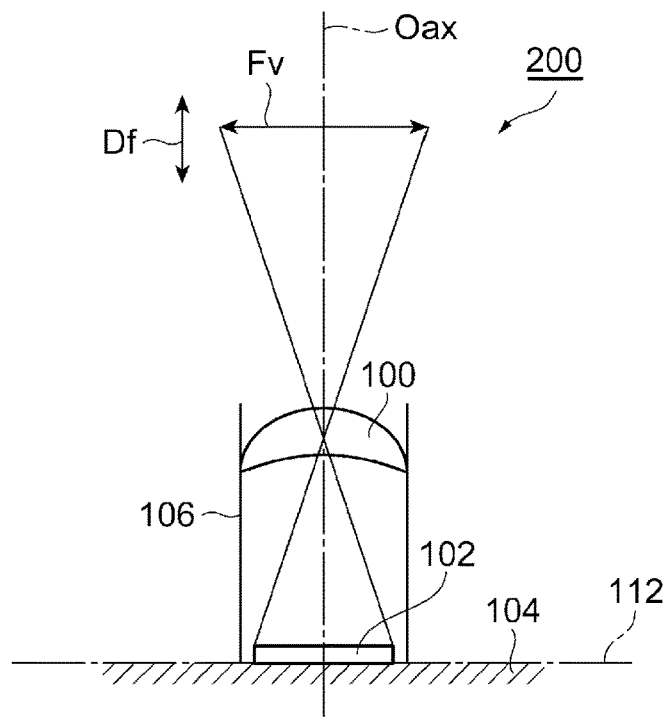
FIG. 5 is a diagram for explaining a typical conventional optical system employed in an optical code reader.

With this configuration, a pointer Pt is positioned at the center of a field of view Fv as shown in FIG. 4. The pointer that is positioned at the center of the field of view Fv is denoted by the reference symbol Pt(o) in FIG. 4. The pointer Pt may be positioned in a distant region "A" or a close region "B". In FIG. 4, a pointer in the distant region "A" is denoted by the reference symbol Pt(d), and a pointer in the close region "B" is denoted by the reference symbol Pt(c). The central pointer Pt(o), the distant pointer Pt(d), and the close pointer Pt(c) preferably have different shapes in order to distinguish the center of the field of view Fv, the distant region "A", and the close region "B" from each other. In a conventional technique, aimer light is emitted from a side of the field of view, and as a result, it is virtually impossible to coincide the position of the pointer with the center of the field of view at all time.

Figure 13:
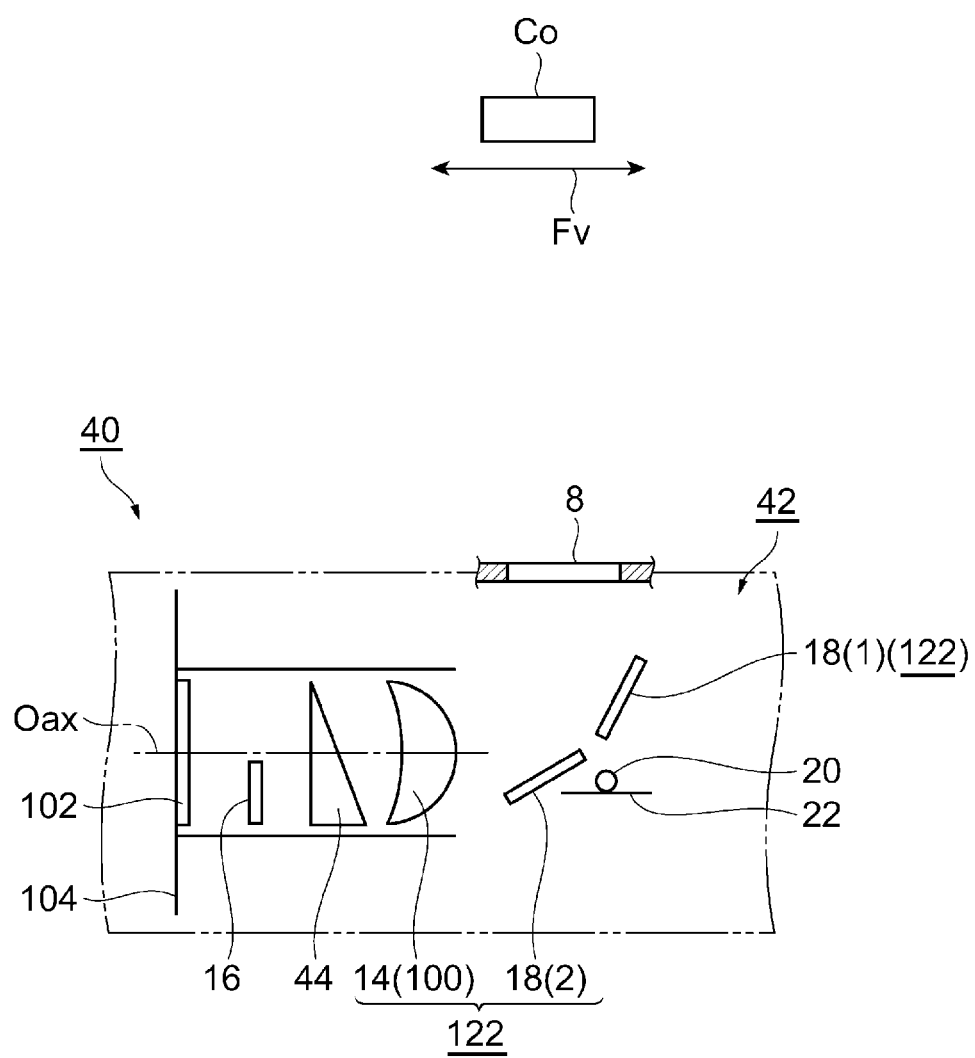
FIG. 13 shows a configuration of the optical system included in the optical code reader of a second embodiment.

FIG. 13 is a diagram for explaining an outline of an optical code reader 40 of a second embodiment. The optical code reader 40 of the second embodiment differs from the optical code reader 2 of the first embodiment only in the optical system. FIG. 13 corresponds to FIG. 12 relating to the first embodiment. In the description of the second embodiment, the same elements as those in the first embodiment are denoted by the same reference symbols, and descriptions thereof are omitted.

In an optical system 42 included in the optical code reader 40 of the second embodiment, the image sensor 102 is placed on a vertical plane 112, which is shown in FIG. 7. The vertical plane 112 orthogonally crosses the optical axis Oax of the imaging lens module 14. Thus, the image sensor 102 is not disposed obliquely unlike the first embodiment. The focusing distance adjusting medium 44 is disposed between the imaging lens module 14 and the image sensor 102. The focusing distance adjusting medium 44 is composed of an optical member in which the thickness gradually changes in a direction orthogonal to the optical axis Oax of the imaging lens module 14. The focusing distance adjusting medium 44 is made of a material with a high visible light transmittance. The clause "thickness gradually changes" means that the thickness changes continuously or stepwisely. It is generally known that, assuming that a refractive index in a vacuum is "1", an optical path length is extended by "n" times when light passes through a medium with a refractive index of "n". In more detail, assuming that the speed of light traveling in a vacuum is represented as "c", the speed of light passing through the medium with the refractive index of "n" is represented as "c/n". Thus, the time for light to pass through a medium with a length of "L" is represented as t=L/(c/n) =nL/c. That is, this time is calculated from "distance/speed". Thus, the distance at which light passes in the medium corresponds to a distance of "nL" at which light travels in a vacuum.

In the second embodiment, the focusing distance adjusting medium 44 is interposed between the imaging lens module 14 and the image sensor 102. This enables substantially changing the imaging distance "a" and the focusing distance "b" in the direction orthogonal to the optical axis Oax of the imaging lens module 14. Thus, the focusing distance adjusting medium 44 provides substantially the same effects as the oblique disposition of the image sensor 102 as in the case of the first embodiment. The focusing distance adjusting medium 44 specifies two regions in the light receiving surface 108 of the image sensor 102, and the boundary parts of the two regions may overlap each other as in the case of the first embodiment.

Figure 14:
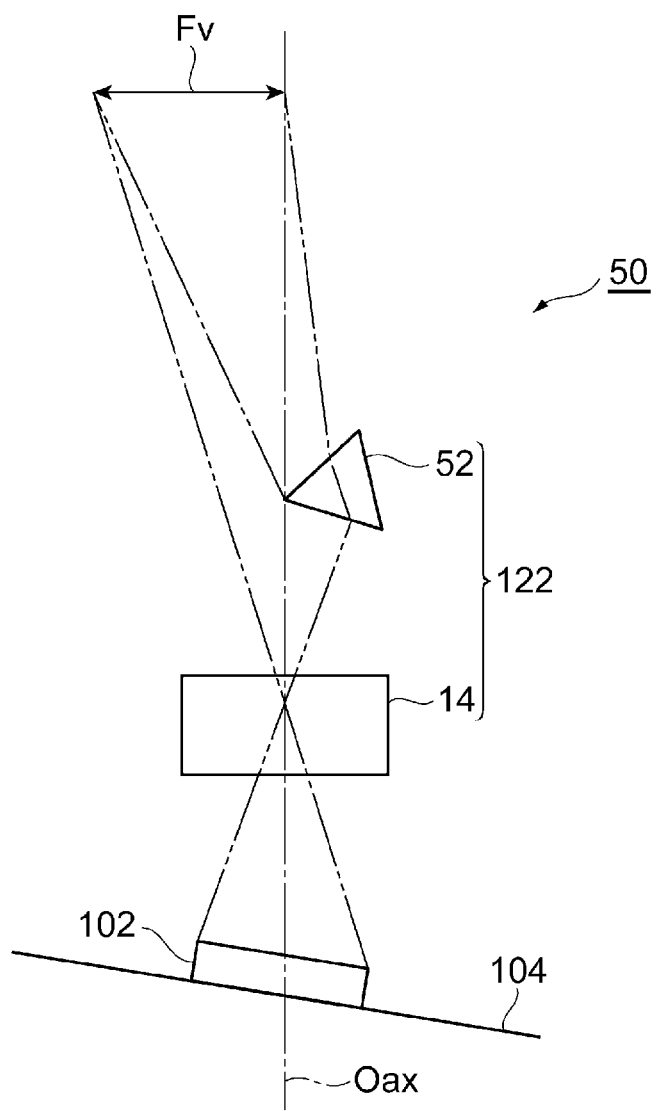
FIG. 14 shows a modification example of the optical system included in the optical code reader of the first embodiment.
Figure 15:
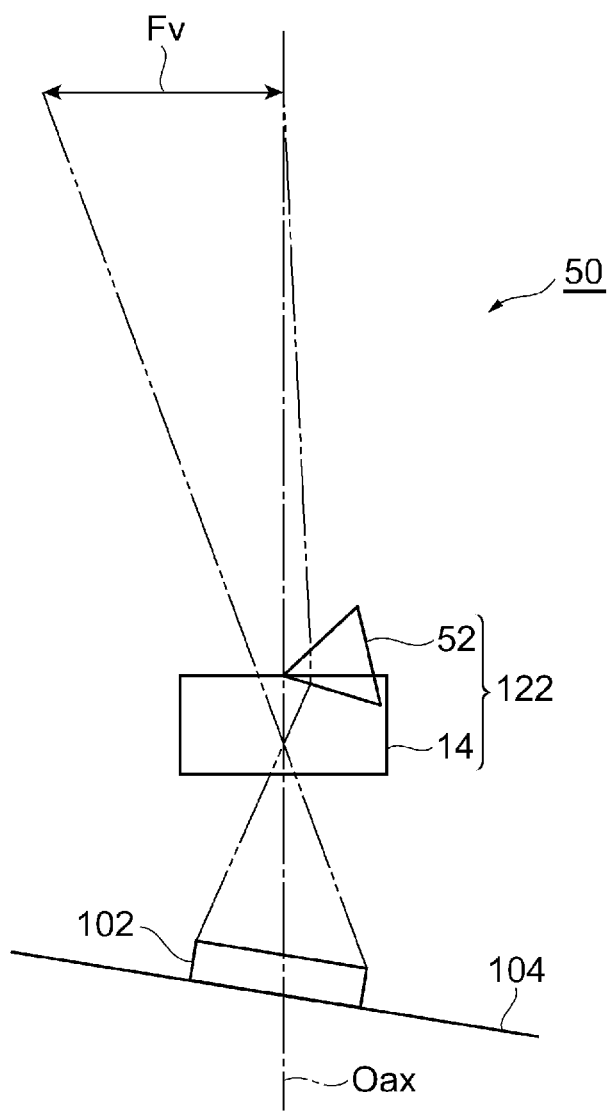
FIG. 15 shows a modification example of the optical system shown in FIG. 14.

The optical system 30, which is described with reference to FIG. 12, has the light-receiving region limiting optical member 122 that includes the first mirror 124(1) and the second mirror 124(2). FIG. 14 shows an optical system 50 that is a modification example of the optical system 30 included in the optical code reader 2 of the first embodiment. The optical system 50 of the modification example shown in FIG. 14 has the light-receiving region limiting optical member 122 that includes a prism 52. The prism 52 is equivalent to the combination of the first mirror 124(1) and the second mirror 124(2). The optical system 50 shown in FIG. 14 employs the prism 52 instead of the first mirror 124(1) and the second mirror 124(2). The prism 52 may be disposed apart from the imaging lens module 14 as shown in FIG. 14 or may be incorporated in the imaging lens module 14 as shown in FIG. 15.

Figure 16:
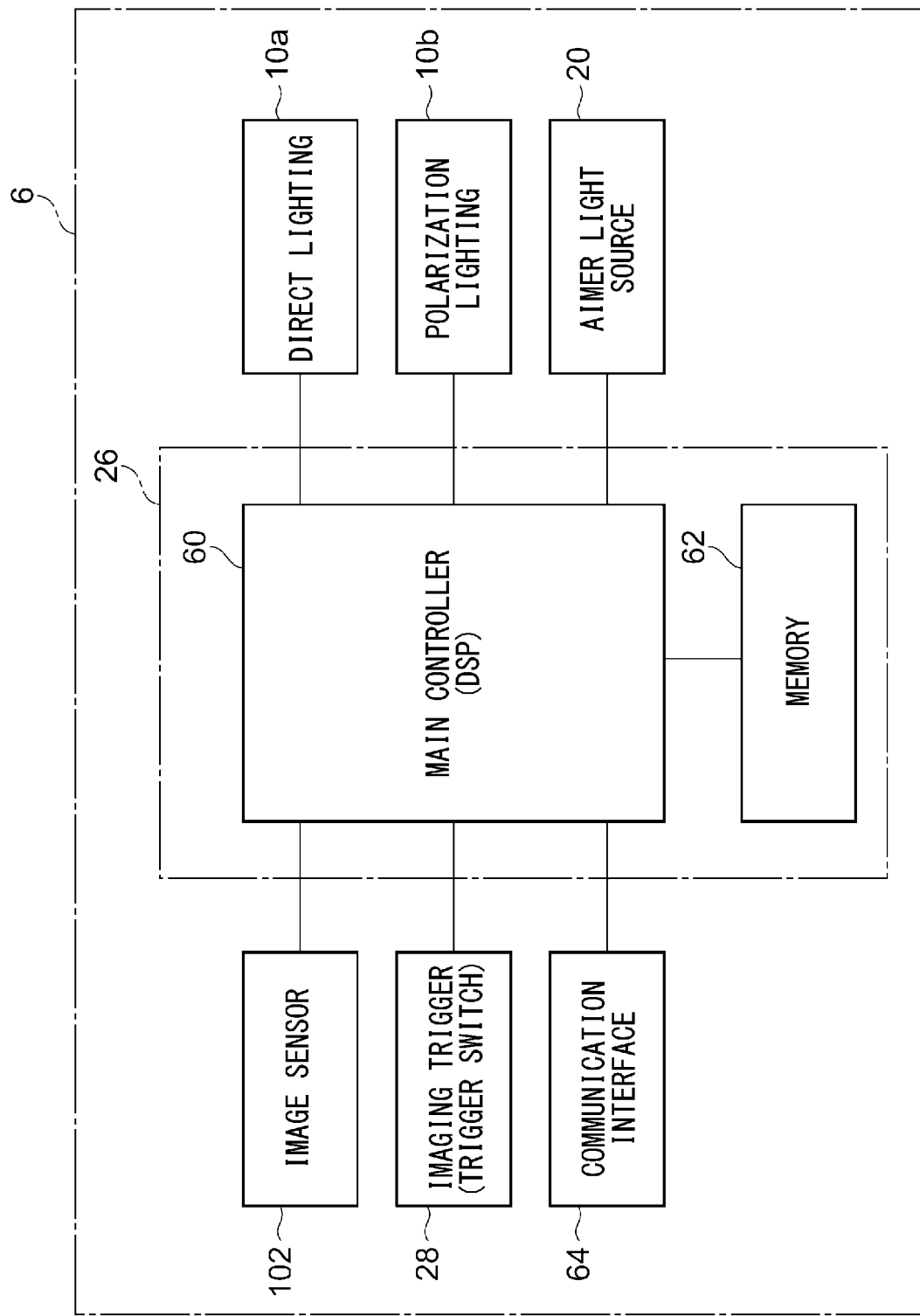
FIG. 16 is a block diagram of the optical code reader according to the present invention.

FIG. 16 is a block diagram for each of the optical code reader 2 of the first embodiment and the optical code reader 40 of the second embodiment. A main controller 60 shown in FIG. 16 is specifically composed of a digital signal processor (DSP) and constitutes a reading processor for reading a target optical code. The main controller 60 and a memory 62 shown in FIG. 16 are mounted on the control board 26 shown in FIG. 11. Each of the optical code readers 2 and 40 has a communication interface 64 and transmits and receives signals to and from an external device via the communication interface 64 by wired or wireless communication. The external device is typically a personal computer or a control apparatus.

Figure 17:
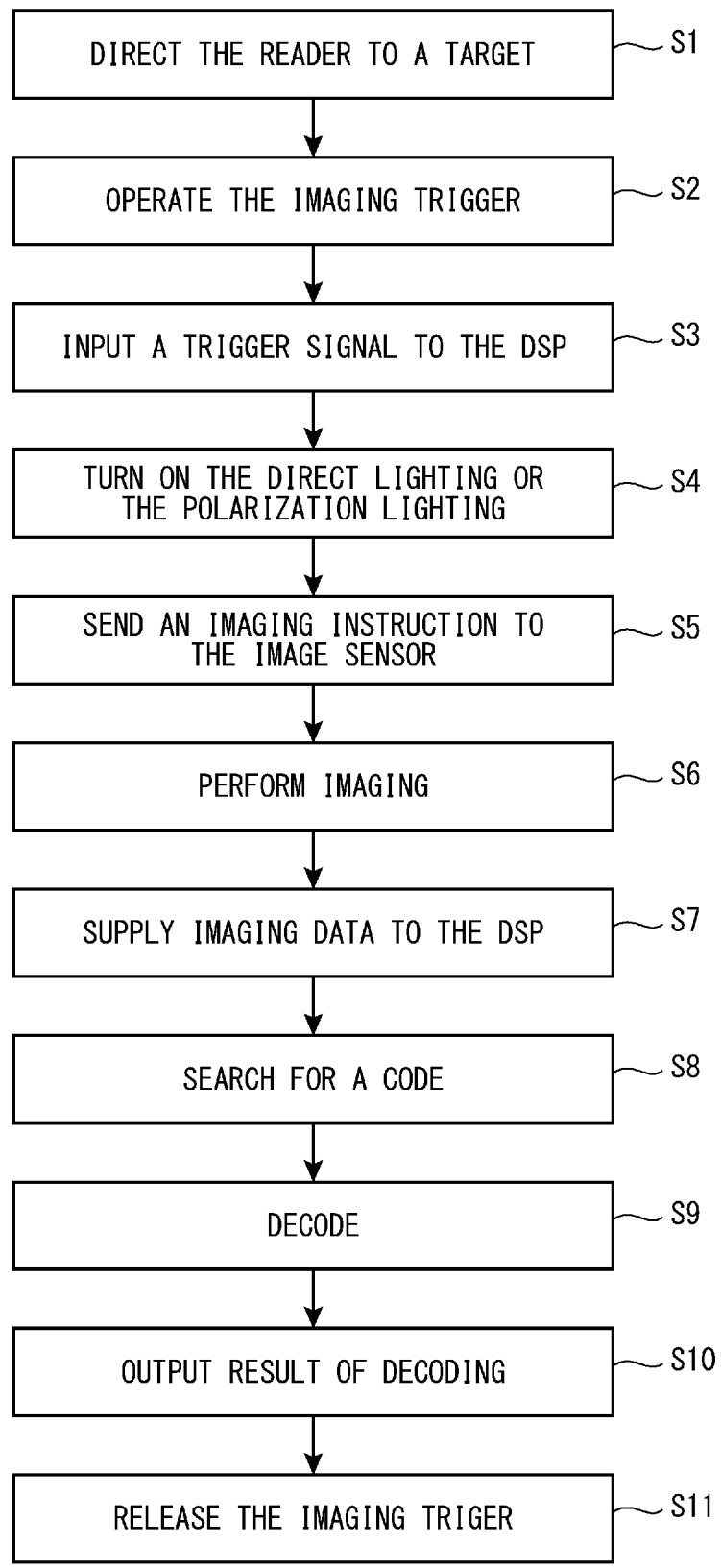
FIG. 17 is a flowchart for explaining operation and processing relating to reading of an optical code.

Operation and processing of the optical code reader 2 of the first embodiment will be described with reference to the flowchart shown in FIG. 17 hereinafter. These are also applied to the optical code reader 40 of the second embodiment.

An operator who grips the grip 4 shown in FIG. 11 directs the optical code reader 2, or more precisely, the transparent window 8, to a target optical code (step S1). The operator then pulls the imaging trigger 28 (step S2). The optical code reader 2 has a switch (not shown) that detects operation of the imaging trigger 28 as in a conventional technique. A trigger signal from the switch is input to the DSP 60 (step S3).

The memory 62 shown in FIG. 16 stores a program relating to reading of a code. The operation and processing of the optical code reader 2 are executed in accordance with this program.

Illuminating conditions and imaging conditions are preliminarily set and are selectable by a user. The illuminating conditions include a lighting pattern, turning on and off of each of the direct lighting 10a and the polarization lighting 10b, and the like. The imaging conditions include an exposure time, a gain value, and the like.

Figure 6:
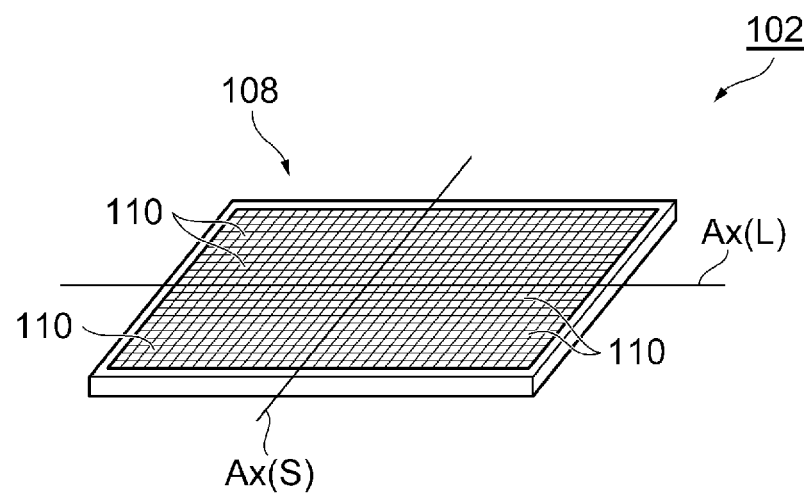
FIG. 6 is a schematic diagram of an available image sensor.

Upon receiving the trigger signal, the DSP 60 turns on or off the direct lighting 10a or the polarization lighting 10b (step S4). The DSP 60 sends an imaging instruction to the image sensor 102 on the basis of the preliminarily set illuminating conditions and imaging conditions (step S5). In response to this, the image sensor 102 executes imaging (step S6) and supplies imaging data to the DSP 60 (step S7). The DSP 60 executes code searching on the basis of the received imaging data (step S8). The code searching is performed by scanning from one end side of the short axis Ax(S) of the image sensor 102 shown in FIG. 6. Code coordinates are stored in the memory 62 at the time a code is found. A code may not be decoded from the two images Im(1) and Im(2) when the code searching is executed from the one end side to the other end side of the short axis Ax(S) shown in FIG. 6. In this case, the imaging is executed again in step S6 by changing the illuminating conditions. In a case in which a code is not found in each of the specified illuminating conditions, timeout processing is performed. Although the illuminating conditions are changed when a code is not decoded herein, the present invention is not limited to this procedure, and imaging may be performed in advance by changing the illuminating conditions.

A decode processing is performed by extracting a code on the basis of the code coordinates stored in the memory 62 (step S9). That is, the optical code reader 2 of the first embodiment has a decode processing function and outputs result of the decode processing to an external device via the communication interface 64 (step S10). When the operator stops operating the imaging trigger 28 and releases the imaging trigger 28 (step S11), the optical code reader 2 stops the sequence of operation.

The embodiments of the present invention are described above on the basis of the specific example. In the specific example, the two images Im(1) and Im(2) are formed on the image sensor 102, and the images Im(1) and Im(2) of the optical code Co are respectively formed in two regions on one side and the other side across the long axis Ax(L) of the image sensor 102. The present invention further includes modification examples described below.

(1) The optical system of the optical code reader of the present invention may be configured to form three or more images Im respectively in three or more regions of the image sensor 102.

(2) The optical system of the optical code reader of the present invention may be configured to form the images Im(1) and Im(2) of the optical code Co in two regions on one side and the other side across the short axis Ax(S) of the image sensor 102. That is, the optical system of the optical code reader of the present invention may be configured to form the image Im in each of regions that are defined by dividing in the short axis Ax(S) direction of the image sensor 102. Also in this case, the optical system of the optical code reader of the present invention may be configured to form three or more images Im respectively in three or more regions of the image sensor 102.

(3) The optical system of the optical code reader of the present invention may be configured to form the image Im in each of multiple regions that are defined by dividing the light receiving surface 108 of the image sensor 102 regardless of the long axis Ax(L) and the short axis Ax(S) of the image sensor 102.

What is claimed is:

1. An optical code reader comprising:
    an open window configured to allow light reflected back from an optical code to pass through the open window,
    an image sensor having a light receiving surface for receiving the reflected light entering the open window and configured to output image data on the basis of the reflected light received at the light receiving surface,
    a reading processor configured to read the optical code on the basis of the image data output from the image sensor, and
    a light-receiving region limiting optical member disposed between the open window and the image sensor, including an imaging lens for imaging the reflected light received through the open window on the light receiving surface, and configured to form an image of the optical code in a first light receiving region of the light receiving surface and form an image of the optical code in a second light receiving region that is different from the first light receiving region of the light receiving surface,
    wherein the image sensor is disposed obliquely to a direction orthogonal to an optical axis of the imaging lens so that a focusing distance of the optical code differs between the first light receiving region and the second light receiving region.

2. The optical code reader according to claim 1, wherein the light-receiving region limiting optical member includes multiple mirrors.

3. The optical code reader according to claim 1, wherein the light-receiving region limiting optical member includes a prism.

4. The optical code reader according to claim 2, wherein the multiple mirrors are composed of a first mirror and a second mirror.

5. The optical code reader according to claim 4, wherein the image sensor has a rectangular outer shape in a plan view, and the first light receiving region and the second light receiving region of the image sensor are specified by the first mirror and the second mirror and are separated along a long axis or a short axis of the image sensor.

6. The optical code reader according to claim 5, wherein boundary parts of the first light receiving region and the second light receiving region overlap each other.

7. The optical code reader according to claim 4, further comprising an aimer light source that is disposed to allow aimer light to pass through a gap between the first mirror and the second mirror.

8. The optical code reader according to claim 5, further comprising a polarization filter that is disposed only on a light path for imaging light in the second light receiving region.

* * * * *